United States Patent
Zanter

(10) Patent No.: US 7,844,672 B2
(45) Date of Patent: Nov. 30, 2010

(54) METHODS, SYSTEMS, AND COMPUTER PROGRAM PRODUCTS FOR MANAGING EMAIL IN A CLIENT-SERVER ENVIRONMENT

(75) Inventor: David L. Zanter, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1437 days.

(21) Appl. No.: 11/211,241

(22) Filed: Aug. 25, 2005

(65) Prior Publication Data

US 2007/0050454 A1    Mar. 1, 2007

(51) Int. Cl.
*G06F 15/16* (2006.01)
(52) U.S. Cl. ............... 709/206; 709/207; 709/201; 709/202; 709/203; 713/198
(58) Field of Classification Search ........... 709/206, 709/207, 201, 202, 203; 713/198
See application file for complete search history.

(56) References Cited

U.S. PATENT DOCUMENTS

| | | | |
|---|---|---|---|
| 6,253,256 B1 | 6/2001 | Wollrath et al. ........... 709/330 |
| 6,745,232 B1 | 6/2004 | Megiddo ................... 709/206 |
| 6,775,689 B1 | 8/2004 | Raghunandan ............. 709/206 |
| 6,816,884 B1 | 11/2004 | Summers .................. 709/206 |
| 6,816,885 B1 | 11/2004 | Raghunandan ............. 709/206 |
| 7,493,550 B1 * | 2/2009 | Kou et al. .................. 714/777 |
| 2003/0135554 A1 * | 7/2003 | Bellotti et al. ............. 709/206 |
| 2004/0090457 A1 | 5/2004 | Serdy, Jr. et al. ........... 345/752 |
| 2004/0133644 A1 | 7/2004 | Warren et al. .............. 709/206 |

FOREIGN PATENT DOCUMENTS

JP         2002108788 A     4/2002

* cited by examiner

*Primary Examiner*—Thu Nguyen
*Assistant Examiner*—Lan-Dai T Truong

(57) ABSTRACT

According to some embodiments of the present invention, email may be managed in a client-server environment by associating an address list with an email at a server. An identifier may be generated that can be used to retrieve the address list associated with the email at the server. The identifier may be encoded to generate a local part of a truncated address list. The identifier may be encoded to generate a domain part of the truncated address list. The address list in the email may be replaced with the truncated address list that comprises the local part and the domain part.

15 Claims, 5 Drawing Sheets

METHODS, SYSTEMS, AND COMPUTER PROGRAM PRODUCTS FOR MANAGING EMAIL IN A CLIENT-SERVER ENVIRONMENT

BACKGROUND OF THE INVENTION

The present invention relates to data processing methods, systems, and computer program products, and, more particularly, to data processing methods, systems, and computer program products for managing email in a client-server environment.

Electronic client devices, such as personal digital assistants, cellular phones, and the like, may be used to receive, send, and generally manage emails. Such devices are often used in conjunction with a host server device where the user's email may also be stored. As a result, a synchronization server may be used to synchronize the email stored on the client device with the email stored on the host server device. Unfortunately, client devices may have limited memory space, which may result in the need to truncate various email fields, such as the "To," "CC," and/or "BCC" lists. Because data integrity and the prevention of data loss are goals of synchronization, however, reconstruction of truncated fields is a part of the server-client synchronization interaction. Because the client devices may have finite, strict, and/or unchangeable limitations as to the amount of information that can be stored in their fields, methods for truncation may be used for one or more fields in a manner that allows for lossless reconstruction.

One approach to truncation of email fields involves the use of Globally Unique IDentifiers (GUIDs) by the synchronization server and the client device. The synchronization server controls the truncation process and tracks mapping information between the synchronization server's GUID and the client device's GUID for each individual email. In particular, the synchronization server is able to truncate one or more fields to the necessary size and save information regarding which fields have been truncated on the server during synchronization. If an email item is updated on the client device, then the synchronization server is able to correlate the modified email with the email stored at the host server device using the GUID. The synchronization server may then reject the client device's modification or may use an algorithm to ensure consistency between the version of the email on the client device and the version of the email on the host server device. For this approach to be effective, however, the synchronization server must be able to use the mapping information to retrieve the truncation information. This approach may not be effective when a modification is performed at the client device in such a way that the client uses a different GUID that has no relation to the previous GUID. For example, if the client were to perform a "reply all" to a truncated To/CC/BCC list in an email or a truncated attendee list of a calendar event, then the synchronization server may be unable to resolve the truncation to reconstruct it.

Conventional synchronization servers may address this problem by preventing users from performing such operations. For example, an email's To/CC/BCC list may be completely truncated so that replying is impossible or the email address list may be truncated down to a non-existent address, such as truncated@truncated. Replying to this truncated email address may result in a delivery failure. Such an approach has been justified because, in general, the majority of emails that are responded to are emails with only a few recipients and, therefore, do not need truncation. Also, many emails that do contain numerous recipients are "broadcasted" emails that are typically not conducive to a "reply all" response.

Another conventional solution to this problem is to use a contact group, which is a collection of users that are described by a single name and, therefore, use less space. The synchronization server may take a new email that needs truncation and replace the To/CC/BCC list with a new contact group that has just been created. This may allow the user via the client to reply to all the recipients. This solution may have some drawbacks, however. The solution assumes the atomic synchronization of both email and contacts and, therefore, would not be applicable in an email-only environment. The solution also involves the synchronization server creating contact groups. An end user may find such new contact groups surprising, unexpected, and/or annoying. Moreover, to prevent creating multiple contact groups of the same address list, the synchronization server may need to traverse all of the existing contact groups to parse them for duplicates. Each additional synchronization session may create additional contact groups as more emails are truncated, which may result in a degradation of system performance and end-user satisfaction.

SUMMARY

According to some embodiments of the present invention, email may be managed in a client-server environment by associating an address list with an email at a server. An identifier may be generated that can be used to retrieve the address list associated with the email at the server. The identifier may be encoded to generate a local part of a truncated address list. The identifier may be encoded to generate a domain part of the truncated address list. The address list in the email may be replaced with the truncated address list that comprises the local part and the domain part.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
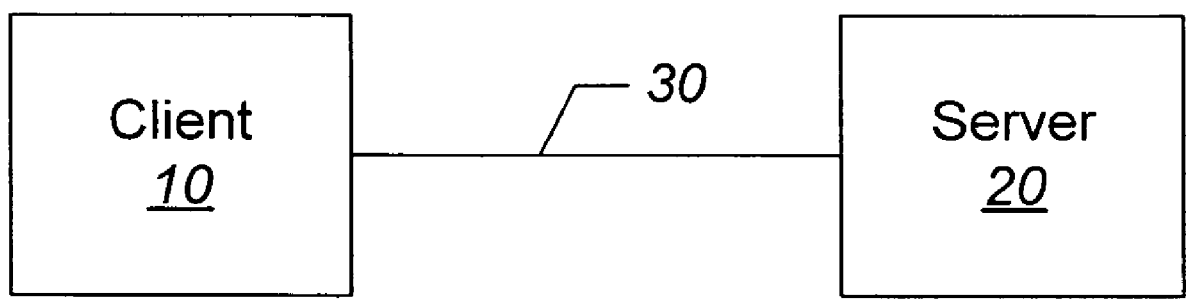
FIG. 1 is a block diagram that illustrates a client-server environment in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments according to the invention can operate in a logically separated client side/server side-computing environment, sometimes referred to hereinafter as a client/server environment. As shown in FIG. 1, a client 10 may communicate with a server 20 over a wireless and/or wireline communication medium 30. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, that requests information, such as web pages, from a server under the control of a user. Examples of clients include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers. A SOAP client can be used to request web services programmatically by a program in lieu of a web browser. The applications provided by the service providers may execute on a server. The server can be a program that responds to the requests from the client. Some examples of servers are International Business Machines Corporation's family of Lotus Domino® servers, the Apache server and Microsoft's Internet Information Server (IIS) (Microsoft Corporation, Redmond, Wash.).

The clients and servers can communicate using a standard communications mode, such as Hypertext Transport Protocol (HTTP) and SOAP. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Figure 2:
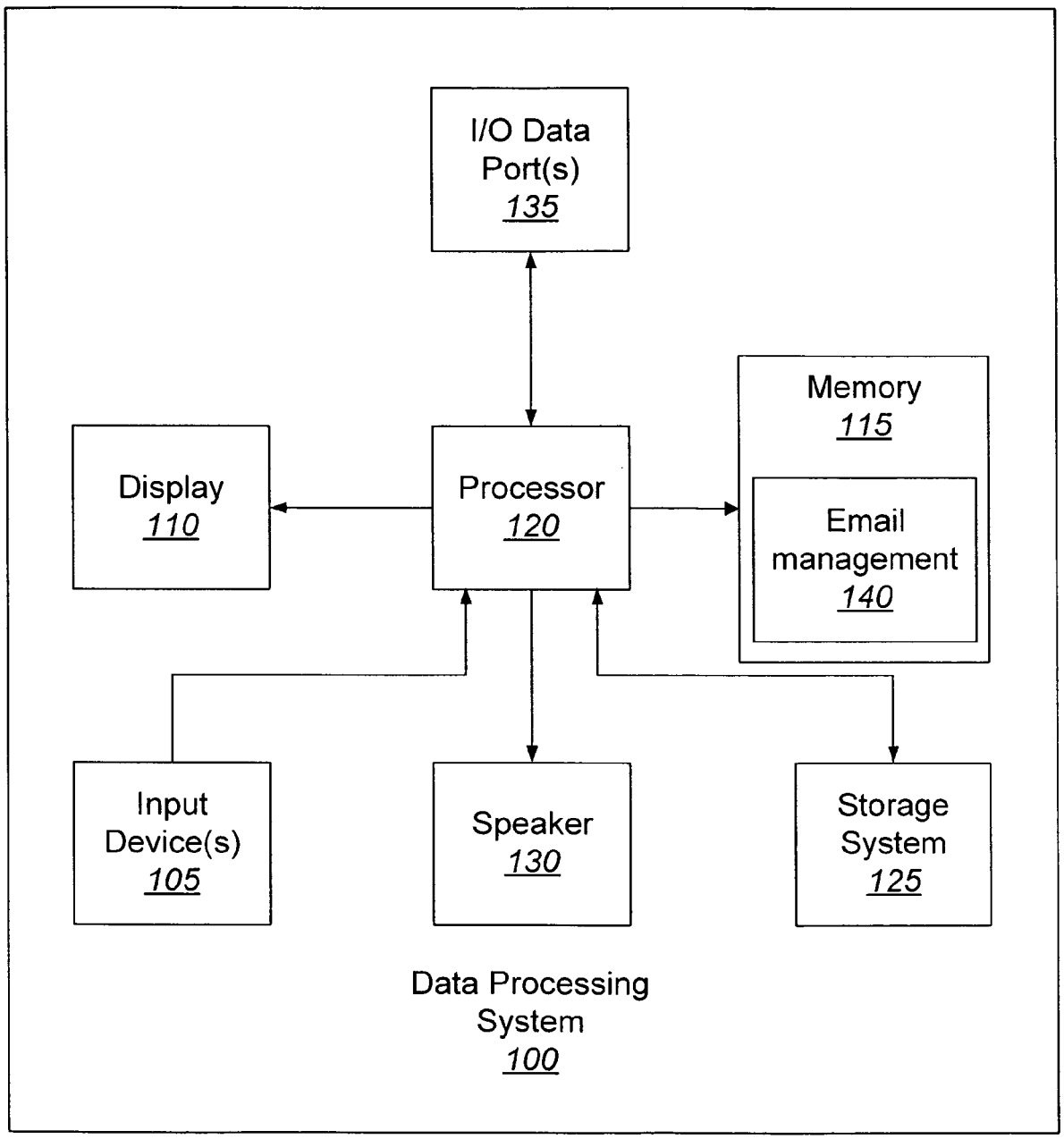
FIG. 2 is a block diagram that illustrates a data processing system that may be used to implement a server in accordance with some embodiments of the present invention.

FIG. 2 illustrates a data processing system 100 that may be used, for example, to implement a synchronization server and may include a module for managing email in a client-server environment, in accordance with some embodiments of the present invention. The data processing system 100 comprises input device(s) 105, such as a keyboard or keypad, a display 110, and a memory 115 that communicate with a processor 120. The data processing system 100 may further comprise a storage system 125, a speaker 130, and an I/O data port(s) 135 that also communicate with the processor 120. The storage system 125 may include removable and/or fixed media, such as floppy disks, ZIP drives, hard disks, or the like as well as virtual storage such as a RAMDISK. The I/O data port(s) 135 may be used to transfer information between the data processing system 100 and another computer system or a network (e.g., the Internet). These components may be conventional components, such as those used in many conventional computing devices, and their functionality, with respect to conventional operations, is generally known to those skilled in the art. The memory 115 may be configured with an email management module 140 that may be used to store and manage emails for a user of a client device. For example, a user may have a portable client device, such as a personal digital assistant or mobile terminal, from which the user may send and receive emails. The user may, however, wish to store his/her emails on a server for longer-term retention because of the additional memory resources available on the server. As a result, the user may periodically synchronize the emails stored on the client device with those stored on the server. According to some embodiments of the present invention, the email management module 140 may be used to truncate lengthy email address lists of emails to save memory on a client device, while allowing the user to reply, forward and modify an email in any manner of their choosing while still retaining access to the original, non-truncated address lists.

Figure 3:
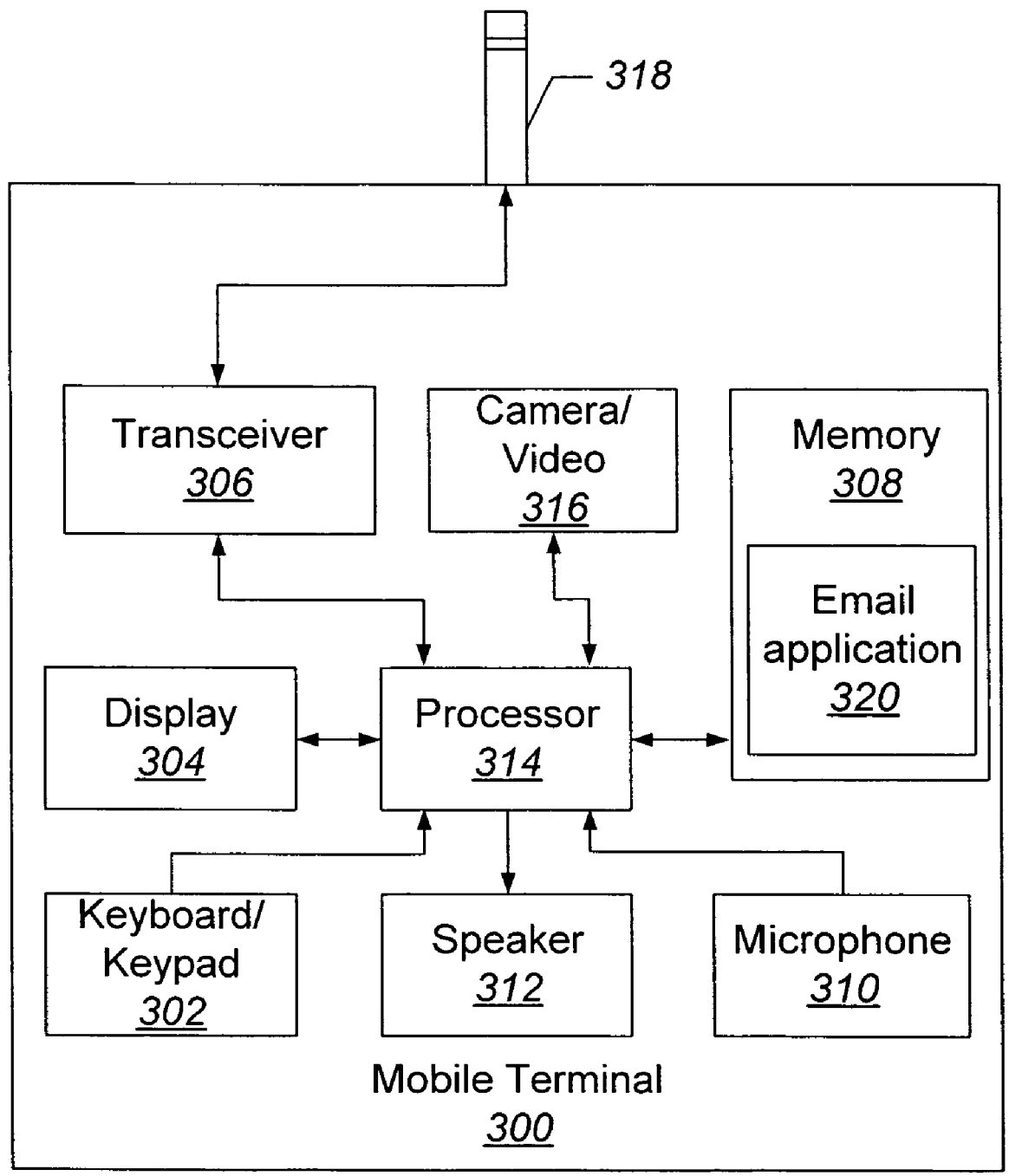
FIG. 3 is a block diagram that illustrates a mobile terminal that may be used to implement a client device in accordance with some embodiments of the present invention.

Referring now to FIG. 3 an exemplary electronic client device, such as a mobile terminal 300, in accordance with some embodiments of the present invention, includes a keyboard/keypad 302, a display 304, a transceiver 306, a memory 308, a microphone 310, a speaker 312, and a camera/video module 316 that communicate with a processor 314. The transceiver circuit 306 typically includes a transmitter circuit and a receiver circuit, which cooperate to transmit and receive radio frequency signals to base station transceivers via an antenna 318. In addition, the transceiver 306 may include a Bluetooth transceiver circuit that may facilitate wireless communication with other Bluetooth enabled devices, such as a synchronization server, using the Bluetooth protocol. The Bluetooth protocol is an open standard for short-range (10 meters) and low speed (up to 1 Mbps) wireless transmission of digital voice and data in the unlicensed 2.4 GHz band, which supports both point-to-point and multipoint applications. The memory 308 may represent a hierarchy of memory that may include volatile and/or non-volatile memory, such as removable flash, magnetic, and/or optical rewritable non-volatile memory. The radio frequency signals transmitted between the mobile terminal 300 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 300 may be included in many conventional mobile terminals and their functionality is generally known to those skilled in the art.

The memory 308 may include an email application module 320 that may be used to send and receive emails, organize a calendar, accept and assign tasks, and other similar functionality. The email application module 320 may also communicate with an email management module, such as email management module 140 of FIG. 2, on a synchronization server to synchronize emails that are stored both on the mobile terminal 300 and emails that are stored on the synchronization server. The synchronization may be performed over a wireless connection, such as a Bluetooth connection, or directly through a wireline connection via a port on the synchronization server.

For purposes of illustration, embodiments of the present invention are described herein in the context of the client device being a mobile terminal. It will be understood, however, that the present invention is not limited to such embodiments and may be embodied generally as any electronic device that may function as a client device in a client-server environment.

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Although FIGS. 2 and 3 illustrate exemplary hardware/software architectures that may be used to manage email in a client-server environment, it will be understood that the present invention is not limited to such configurations but is intended to encompass any configuration capable of carrying out operations described herein. Moreover, the functionality of the data processing system 100 of FIG. 2 and/or the mobile terminal 300 of FIG. 3 may be respectively implemented as a single processor system, a multi-processor system, or even a network of stand-alone computer systems, in accordance with various embodiments of the present invention.

Computer program code for carrying out operations of data processing systems and mobile terminals discussed above with respect to FIGS. 2 and 3 may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even microcode to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for managing email in a client-server environment, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
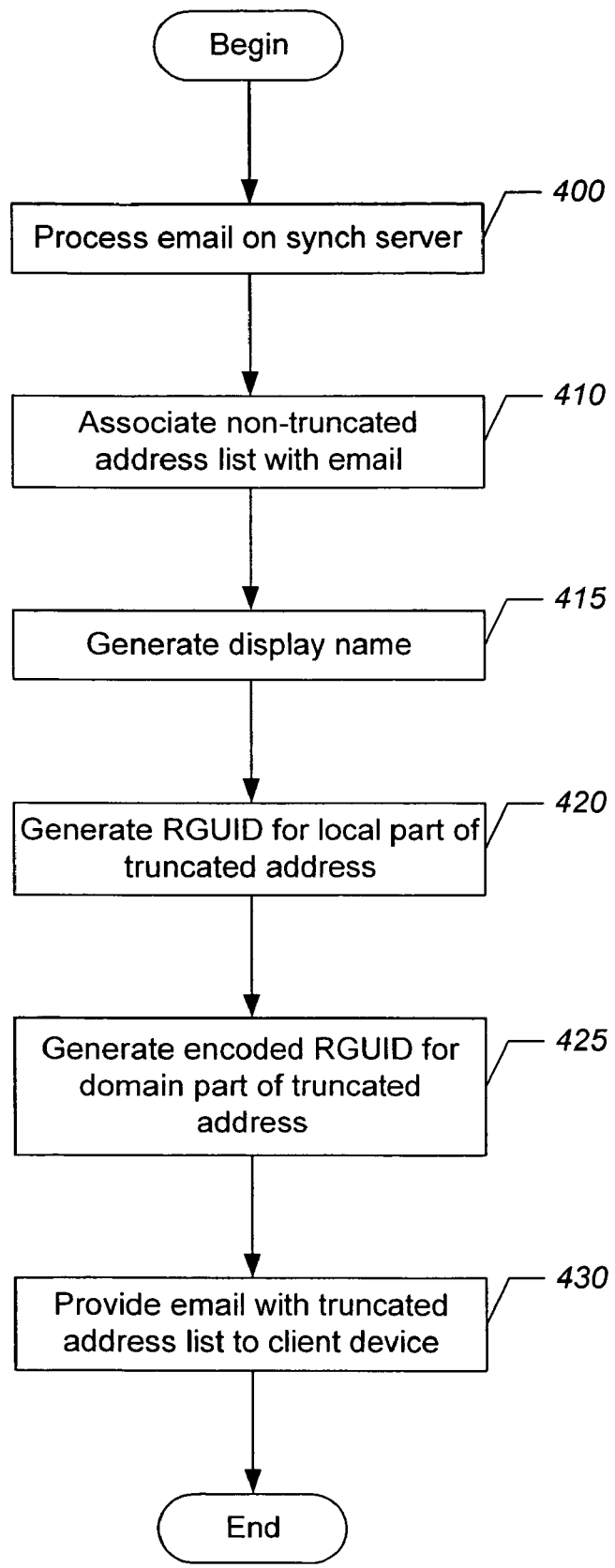
FIGS. 4 and 5 are flowcharts that illustrate operations for managing email in a client-server environment in accordance with some embodiments of the present invention.

FIG. 4 illustrates operations for truncating a message stored on a synchronization server, in accordance with some embodiments of the present invention. Operations begin at block 400 where the synchronization server processes an email having an address list, e.g., a To/CC/BCC list, that is suitably lengthy that it may be beneficial to truncate to save room on a client device on which it may be later stored. At block 410, the synchronization server may store the email such that the original, non-truncated address list is associated with the email. In accordance with various embodiments of the present invention, the email may be stored in a table or other suitable data structure.

The synchronization server may generate a display name, such as, for example, "15 Addresses Truncated" for the email to inform the user that the address list for this particular email has been truncated at block 415.

The synchronization server may use a Globally Unique IDentifier (GUID) to access the email and its associated, non-truncated address list in the data structure in which it is stored. Thus, according to some embodiments of the present invention, the local part of the truncated email address, i.e., the portion of the email address before the @ sign, may be generated at block 420 in a manner that is dependent on the type of GUID that is used for the email. For example, if a sequence of bytes is used (BGUID), then the local part of the truncated email address may be generated by encoding the BGUID using a Base64 encoding algorithm in accordance with some embodiments of the present invention. If, however, the GUID is a numerical representation, such as an iterative count of emails, that is represented as an integer or long integer, then the synchronization server may encode the GUID into an ASCII string or a Base64 encoded version of the serialized number. The encoded GUID may be called a representation of the GUID (RGUID) and may be used as the local part of the truncated email address. Optionally, the synchronization server may append a token to the RGUID to immediately identify the email address as a truncated email address, which may conserve processor resources on the synchronization server during the untruncation process. One example of such a token is a ^, which may be chosen because few valid email addresses begin with this character.

At block 425, the synchronization server generates the domain part of the truncated email address, i.e., the part after the @ sign, by encoding the RGUID to ensure the integrity of the RGUID. In accordance with some embodiments of the present invention, a one-way encryption algorithm, a checksum of the RGUID, or a Base64 encoding of the RGUID may be used to generate the encoded RGUID. It will be understood that these encoding schemes are merely exemplary and that other encoding schemes may be used in accordance with various embodiments of the present invention.

The synchronization server may then provide the email to the client device during synchronization with the lengthy address list replaced by a truncated address list comprising the RGUID as the local part and the encoded RGUID as the domain part along with an optional display name that may indicate how many addresses have been truncated at block 430.

Figure 5:
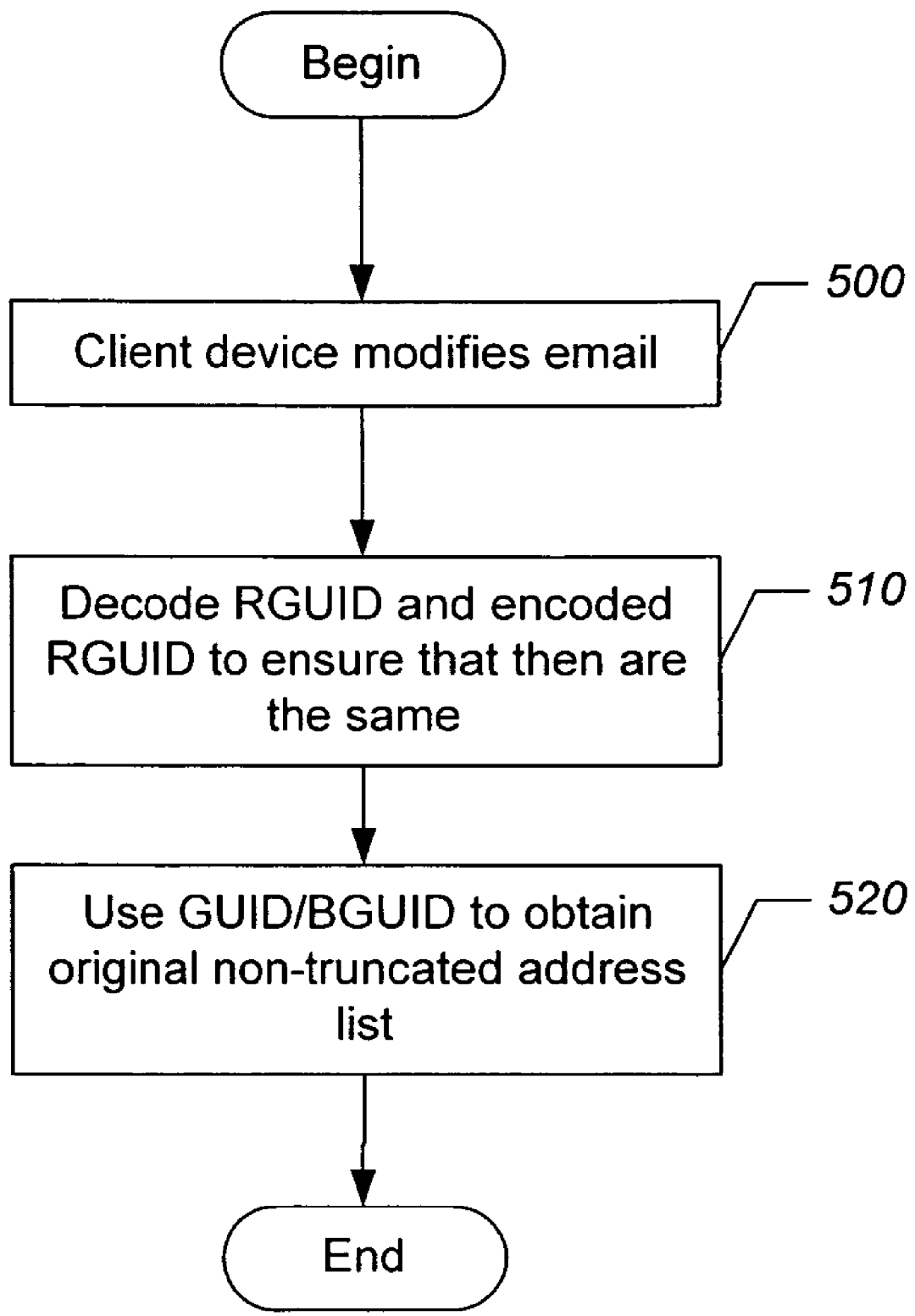

FIG. 5 illustrates operations for untruncating a message in accordance with some embodiments of the present invention. Operations begin at block 500 where a client device replies, forwards, or otherwise modifies an email message. Communication is established with the synchronization server and the synchronization server parses the address list. If a token is used in truncating the address list as discussed above with respect to block 420 of FIG. 4, then processing would only continue if the email address includes the appended token. If a token is not used, then the synchronization server examines the email address to determine if it is a valid address or if it corresponds to a truncated address list.

If the address list is a truncated address list, then the synchronization server decodes the RGUID, i.e., local part of the truncated address, to obtain the GUID or BGUID and decodes the encoded RGUID, i.e., the domain part of the truncated address, to verify that the result is equal to the decoded RGUID at block 510.

The GUID or BGUID may then be used to access the full, untruncated address list that is associated with the email via the data structure stored on the synchronization server to reconstruct the original email message with the full address list at block 520. The email may then be processed as a conventional email.

If an error occurs during the untruncation process of FIG. 5, then the synchronization server may invoke any recovery mechanisms that are available or may generate a delivery failure notice or an email rejection notice to the user via the client device.

The flowcharts of FIGS. 4 and 5 illustrate the architecture, functionality, and operations of some embodiments of methods, systems, and computer program products for managing email in a client-server environment. In this regard, each block represents a module, segment, or portion of code, which comprises one or more executable instructions for implementing the specified logical function(s). It should also be noted that in other implementations, the function(s) noted in the blocks may occur out of the order noted in FIGS. 4 and/or 5. For example, two blocks shown in succession may, in fact, be executed substantially concurrently or the blocks may sometimes be executed in the reverse order, depending on the functionality involved.

Advantageously, some embodiments of the present invention may allow for a large email address list to be compressed and truncated into a form that complies with the framework of RFC 2822 and, thus, is transparent to the client device. Moreover, the end user may reply, forward, and modify the email with the truncated address list in any manner of his or her choosing. This is accomplished by replacing the original email address list with a singular email address that contains embedded information that can be extracted and used by the server to retrieve the original information.

Some embodiments of the present invention may offer the advantage of implementing the functionality of "reply to all" for any email regardless of the size of the email address list, client device limitations, or finite field restrictions. The end user experience may also be similar to that of higher-fidelity environments. The user may receive an email, click reply all, and click send, which is nearly identical to a desktop email application. Some embodiments of the present invention embed information into a standard RFC 2822 email address, which is generally used by the majority of email applications. The truncation and untruncation process is generally low overhead and scalable. The truncation process involves the examination of modified email entries and parsing the address lists and comparing them to known device limitations. Where an address list is determined to be too large, the synchronization server may encode at least one string of a defined length. The untruncation process need only examine new modifications of emails generated by the client device. The local part of the email address is examined to determine if it includes a token. If so, then the address represents a truncated address list. The synchronization server then decodes the truncated address to obtain the original address list that is associated with the email.

Many variations and modifications can be made to the preferred embodiments without substantially departing from the principles of the present invention. All such variations and That which is claimed:

1. A computer-implemented method of managing email in a client-server environment, comprising:
   a processor associating a non-truncated address list with an email, wherein the email originates from a client device that has been determined to have insufficient local memory for storing all of the non-truncated address list;
   the processor generating an identifier that can be used to retrieve the non-truncated address list from the server, wherein the identifier is a globally unique identifier (GUID) used to identify the non-truncated address list;
   encoding the identifier to generate a local part of a truncated email address, wherein the local part of the truncated email address is before an @ sign in an email address;
   encoding the local part of the truncated email address to generate a domain part of the truncated email address, wherein the domain part of the truncated email address is after the @ sign in an email address;
   replacing, in the email, the non-truncated address list with the truncated email address, wherein the truncated email address corresponds to a truncated address list, that comprises the local part and the domain part; and
   adding a display name to the email indicating that the non-truncated address list has been replaced with the truncated address list.

2. The computer-implemented method of claim 1, wherein the identifier is a globally unique identifier (GUID).

3. The computer-implemented method of claim 1, wherein the display name indicates how many email addresses have been truncated from the non-truncated address list to create the truncated address list.

4. The computer-implemented method of claim 1, further comprising:
   the server detecting a retransmission of the email having the truncated address list;
   parsing the truncated address list to obtain the local part and the domain part of the truncated address list;
   decoding the local part of the truncated address list to obtain a first identifier;
   decoding the domain part of the truncated address list to obtain a second identifier;
   decoding the second identifier to obtain a third identifier;
   in response to the first identifier matching the third identifier, utilizing the first identifier to locate and retrieve the non-truncated address list; and
   transmitting the non-truncated address list to a retransmitter of the email.

5. The computer-implemented method of claim 1, wherein the truncated address list is identified by a leading token character in the local part of the truncated email address.

6. The computer-implemented method of claim 5, wherein the leading token character is a ^ symbol.

7. A computer system comprising:
   a processor, a computer readable memory, and a computer readable storage media;
   first program instructions to associate a non-truncated address list with an email, wherein the email originates from a client device that has insufficient local memory to store all of the non-truncated address list;
   second program instructions to generate an identifier that can be used to retrieve the non-truncated address list, wherein the identifier is a globally unique identifier (GUID) used to identify the non-truncated address list;
   third program instructions to encode the identifier to generate a local part of a truncated email address, wherein the local part of the truncated email address is before an @ sign in an email address;
   fourth program instruction to encode the local part of the truncated email address to generate a domain part of the truncated email address, wherein the domain part of the truncated email address is after the @ sign in an email address;
   fifth program instructions to replace the non-truncated address list in the email with the truncated email address, wherein the truncated email address corresponds to a truncated address list, that comprises the local part and the domain part; and
   sixth program instructions to add a display name to the email indicating that the non-truncated address list has been replaced with the truncated address list; and
   wherein the first, second, third, fourth, fifth and sixth program instructions are stored on the computer readable storage media for execution by the processor via the computer readable memory.

8. The computer system of claim 7, wherein the display name indicates how many email addresses have been truncated from the non-truncated address list to create the truncated address list.

9. The computer system of claim 7, further comprising:
   seventh program instructions to detect a retransmission of the email having the truncated address list;
   eighth program instructions to parse the truncated address list to obtain the local part and the domain part of the truncated address list;
   ninth program instructions to decode the local part of the truncated address list to obtain a first identifier;
   tenth program instructions to decode the domain part of the truncated address list to obtain a second identifier;
   eleventh program instructions to decode the second identifier to obtain a third identifier;
   twelfth program instructions to, in response to the first identifier matching the third identifier, utilize the first identifier to locate and retrieve the non-truncated address list; and
   thirteenth program instructions to transmit the non-truncated address list to a retransmitter of the email; and
   wherein the seventh, eighth, ninth, tenth, eleventh, twelfth and thirteenth program instructions are stored on the computer readable storage media for execution by the processor via the computer readable memory.

10. The computer system of claim 7, wherein the truncated address list is identified by a leading token character in the local part of the truncated email address.

11. A computer memory on which is stored a computer program product, said computer program product comprising:
   computer readable program code configured to associate a non-truncated address list with an email, wherein the email originates from a client device that has insufficient local memory to store all of the non-truncated address list;
   computer readable program code configured to generate an identifier that can be used to retrieve the non-truncated address list, wherein the identifier is a globally unique identifier (GUID) used to identify the non-truncated address list;
   computer readable program code configured to encode the identifier to generate a local part of a truncated email address, wherein the local part of the truncated email address is before an @ sign in an email address;

computer readable program code configured to encode the local part of the truncated email address to generate a domain part of the truncated email address, wherein the domain part of the truncated email address is after the @ sign in an email address;

computer readable program code configured to replace the non-truncated address list in the email with a truncated email address, wherein the truncated email address corresponds to a truncated address list, that comprises the local part and the domain part; and computer readable program code configured to add a display name to the email indicating that the non-truncated address list has been replaced with the truncated address list.

12. The computer memory of claim 11, wherein the display name indicates how many email addresses have been truncated from the non-truncated address list to create the truncated address list.

13. The computer memory of claim 11, further comprising:

computer readable program code configured to detect a retransmission of the email having the truncated address list;

computer readable program code configured to parse the truncated address list to obtain the local part and the domain part of the truncated address list;

computer readable program code configured to decode the local part of the truncated address list to obtain a first identifier;

computer readable program code configured to decode the domain part of the truncated address list to obtain a second identifier;

computer readable program code configured to decoded the second identifier to obtain a third identifier;

computer readable program code configured to, in response to the first identifier matching the third identifier, utilize the first identifier to locate and retrieve the non-truncated address list; and computer readable program code configured to transmit the non-truncated address list to a retransmitter of the email.

14. The computer memory of claim 11, wherein the truncated address list is identified by a leading token character in the local part of the truncated email address.

15. The computer memory of claim 14, wherein the leading token character is a ˆ symbol.

* * * * *